United States Patent [19]
Goto et al.

[11] 3,988,972
[45] Nov. 2, 1976

[54] GAS SHIELDING METHOD FOR A FUEL EXCHANGE POOL AND AN APPARATUS THEREFOR

[75] Inventors: Hiroshi Goto; Toshiharu Arai, both of Hitachi; Tadao Sekiguchi, Tokyo; Hideo Hara, Sagamihara, all of Japan

[73] Assignee: Hitachi, Ltd., Japan

[22] Filed: Jan. 15, 1975

[21] Appl. No.: 541,116

[52] U.S. Cl. .................................... 98/36; 176/30; 176/37; 432/64
[51] Int. Cl.² ......................................... F24F 9/00
[58] Field of Search ............ 98/36, 115 LH; 432/64; 176/30, 37; 62/256

[56] References Cited
UNITED STATES PATENTS

| | | |
|---|---|---|
| 2,908,212 | 10/1959 | Bryant ................................... 98/36 |
| 3,437,558 | 4/1969 | Gunson et al. ..................... 176/30 X |
| 3,625,133 | 12/1971 | Hayashi ................................ 98/36 |
| 3,834,293 | 9/1974 | Danieli ............................. 432/64 X |
| 3,880,061 | 4/1975 | Hensiek et al. ..................... 98/36 X |

*Primary Examiner*—William E. Wayner
*Assistant Examiner*—William E. Tapolcai, Jr.
*Attorney, Agent, or Firm*—Craig & Antonelli

[57] ABSTRACT

A gas shielding method for a fuel exchange pool in which, in order to shield radioactive gas generated in said fuel exchange pool by forming a gas curtain flowing in one direction above the fuel pool, both a ratio between a blown-out quantity and a sucked quantity of the gas flow and a temperature difference between the gas and the water in the fuel pool are suitably selected.

6 Claims, 5 Drawing Figures

GAS SHIELDING METHOD FOR A FUEL EXCHANGE POOL AND AN APPARATUS THEREFOR

BACKGROUND OF THE INVENTION

The present invention relates to an improvement of a gas curtain apparatus for a fuel exchange pool of a nuclear reactor.

In a nuclear reactor, vapor of mainly such as rare gases with radioactive contamination is generated from the fuel pool during a fuel exchange, and thus there has been caused a serious problem in that an operator who carries out a fuel exchange around the fuel pool or directly does it on a fuel exchange carrier is exposed to radioactive rays. Now that a frequency of the fuel exchange is increased in accordance with a frequent driving of a nuclear reactor, an influence of the exposure on his body becomes non-negligible by repeating the exposure many times, even if one exposure at the periphery of the fuel pool is lower than allowable value. So this provides a serious problem in health care of the operator.

Conventionally, in connection with an apparatus other than the fuel pool of a nuclear reactor, an air curtain means of so called push-pull-duct system which includes blowing-out ports and suction ports therein has been employed for shielding from bad smell, mist or the like in a plating apparatus or an incinerator hopper. However, it has been difficult to form an air curtain through a wide face such as in case of the fuel exchange pool, because air quantity passing through the blowing-out suction ports is much increased, which leads to a great expense for its equipment.

SUMMARY OF THE INVENTION

The present invention is completed in view of these circumstances and technical problems, and thus an object of the present invention is to provide an air curtain means for a fuel exchange pool which can solve some problems caused in actual realization of the described air curtain means for a nuclear reactor fuel exchange pool and which is economical as well as easily operated.

The present invention is characterized in that an air curtain by the push-pull system is formed above the fuel exchange pool for shielding generated radioactive vapor and an air flow quantity passing through the suction ports is larger than that through the blowing-out ports.

The present invention cause the following effects.

1. Generated radioactive vapor is effectively shielded by means of combination of the function of suction ducts mounted on a side wall of the fuel exchange pool with effects of the air curtain.
2. Generated radioactive vapor can be effectively shielded by means that ratio of a sucked air quantity to a blown-out air quantity is 2.0 – 4.0 and a temperature of the water in the fuel pool is higher than the temperature of the air curtain in a range of 30° C.

DESCRIPTION OF THE PREFERRED EMBODIMENT

Figure 1:
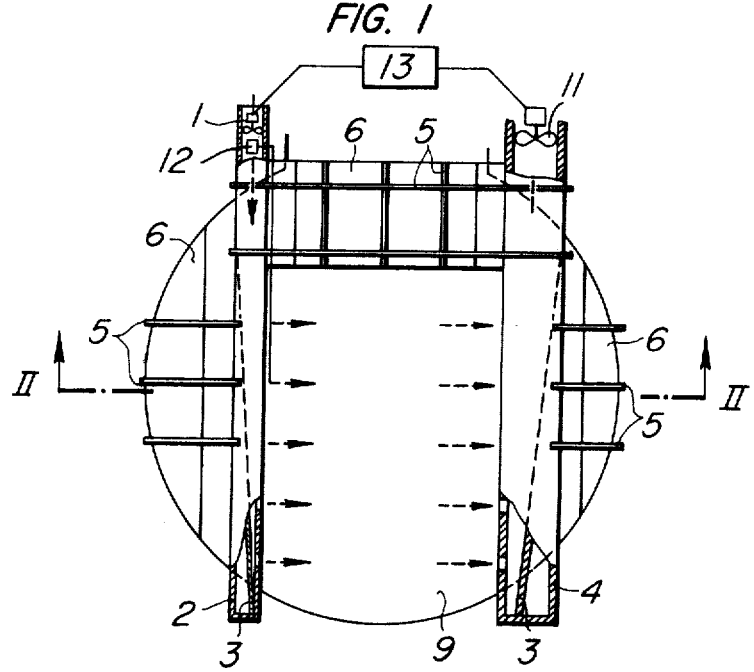
FIG. 1 is a front elevational view of an air curtain means according to the present invention.
Figure 2:
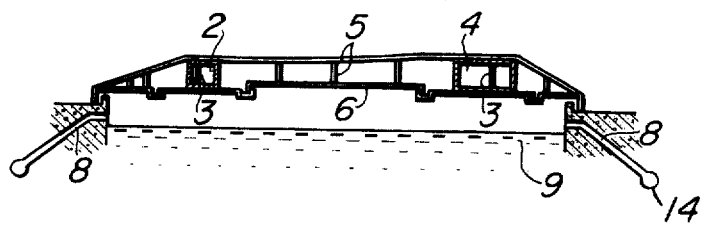
FIG. 2 is a sectional view taken along a line II — II in FIG. 1.

An embodiment of the present invention is shown in FIGS. 1 and 2. The FIG. 2 shows a section taken along a line II — II in FIG. 1. The top of a circular fuel pool 9 is covered in substantially⊐-shaped form by means of a push duct 2, a pull duct 4, a cover 6 and support members 5 except for the port through which a fuel is carried out or in. The push duct 2 and pull duct 4 are opposed to each other and therebetween the port for a fuel body is provided. Opposed surfaces of the ducts are provided with blowing-out ports or suction ports of gas respectively. Provided within the respective ducts are air flow rectifier plates 3 for regulating gas quantity and urging the gas to flow uniformly along the pool surface. An axial flow fan 1 is mounted on gas inlet port of the push duct 2. The pull duct 4 is connected with a suction fan 11. Temperature controlling means 12 such as a steam heater, electric heater or water cooler are provided in the push duct. As for the cover 6, it is preferably made of aluminum in view of its strength, anti-corrosion property and light weight, and the cover is supported by the support members 5. This aluminum plate 6 of the cover will be divided into five parts which consists of both ends, side portion of the push duct 2, side portion of the pull duct 4 and intermediate portion between the both ducts, which facilitates its assemblage. The interval between the both ducts is equal to inner diameter of the nuclear reactor pressure vessel so as to ensure a space required for the fuel exchange.

In view of these all matters, a truss structure is assembled on the fuel pool. Suction ducts 8 are provided above water level around the circular periphery of the pool side wall at several positions thereof.

The present invention is of the above described construction, and thus acts as follows. Pressurized air supplied by the axial flow fan 1 flows in the push duct 2 with maintaining its velocity substantially uniform by rectifier plates 3, and is blown out through nozzles disposed toward the pull duct 4 to thereby flow to the pull duct 4 through above the pool 9. As a result, the velocities of air flows blown out through the nozzles are substantially uniform along the pool surface. On the other hand, the pull duct 4 sucks the air flowing above the pool through the suction ports formed on its surface opposed to the push duct 2. This enables to form an air curtain between the both ducts 2 and 4. In this connection, both axial flow fan 1 and a suction fan are so set that the air quantity sucked into the pull duct 4 is larger than that blown out from the push duct 2, to thereby suck radioactive rare gas generated from the pool 9 into the pull duct. The sucked gas including such as fission product gas passes through an absorption layer having active carbon therein in the next step to remove active components, and thereafter is exhausted from a chimney with a portion of the air re-circulating into the push duct 2. The suction ducts 8 mounted on the pool side walls serve to exhaust the gradually pressurized radioactive gas which is generated during the carrying-in or -out of the fuel body in a space surrounded by the pool side walls, said air curtain and the aluminum plate 6, so as to ensure the effects of the air curtain. And the ducts 8 are connected through a common duct 14 to the pull duct 4. Alternatively, the ducts 8 may be connected to a separate system provided with a suction fan similar to that in the pull duct 4 in order to forward the gas to a gas treating apparatus. The axial flow fan 1 and the suction fan 11 can be mutually controlled in a well-known manner by a conventional controller 13 so as to selectively change the air quantity ratio of the blown-out air and the sucked air.

Thus, the generated radioactive gas is put away from an operator who works to carry out the fuel exchange, by the air curtain in the apparatus of the present invention, and in addition thereto, as mentioned above, since a portion of the radioactive gas is sucked by the suction ducts, a space directly above the pool water level is always maintained in a pressure somewhat lower than the atmospheric pressure of a space in which an operator works to thereby promote the effects of the air curtain.

We will now describe concrete embodiments of the present invention in turn.

Figure 3:
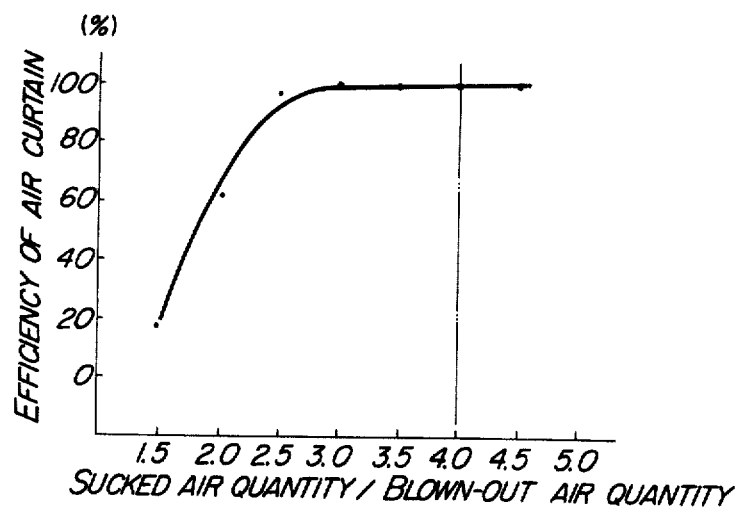
FIG. 3 is a characteristic chart showing air curtain effects of an apparatus of the present invention.

FIG. 3 shows test results obtained by a model test using an air curtain of effective length 600 mm to show influences of the sucked air quantity to blown-out air quantity ratio on the shielding effect of the air curtain. As shown in this figure, when the air quantity ratio is 2.0, substantially 65% of the shielding can be obtained, and when the ratio is more than 3, almost 100% shielding is obtainable.

Figure 4:
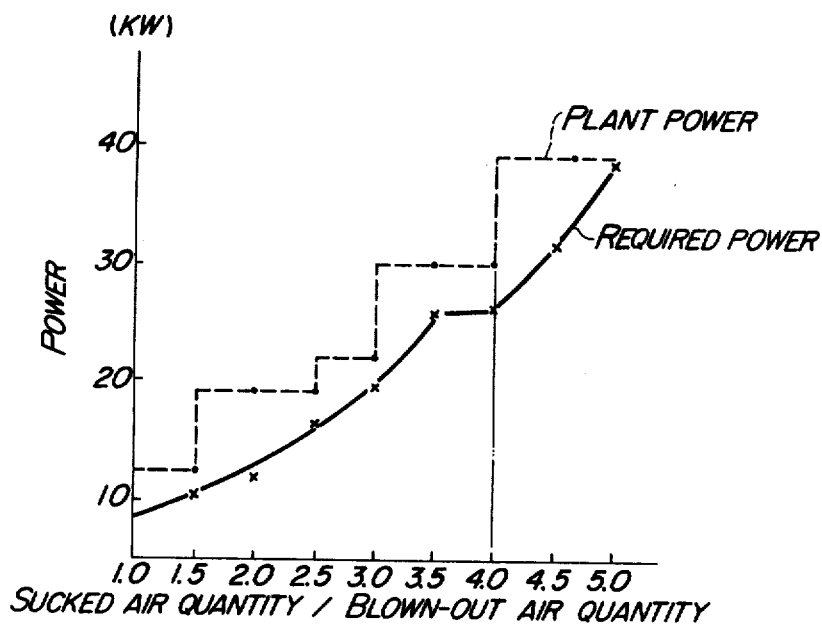
FIG. 4 is a diagram showing plant powers and required powers concerning the present invention.

FIG. 4 is a chart plotted according to the above described air quantity ratios to show required powers based on the same test and plant powers in case that this arrangement is equipped. As apparent from this figure, it is understood that the theoretical required power is abruptly increased when the air quantity ratio is over 4.0. Accordingly, it is suitable that the air quantity ratio is in the range of 2.0 – 4.0.

Figure 5:
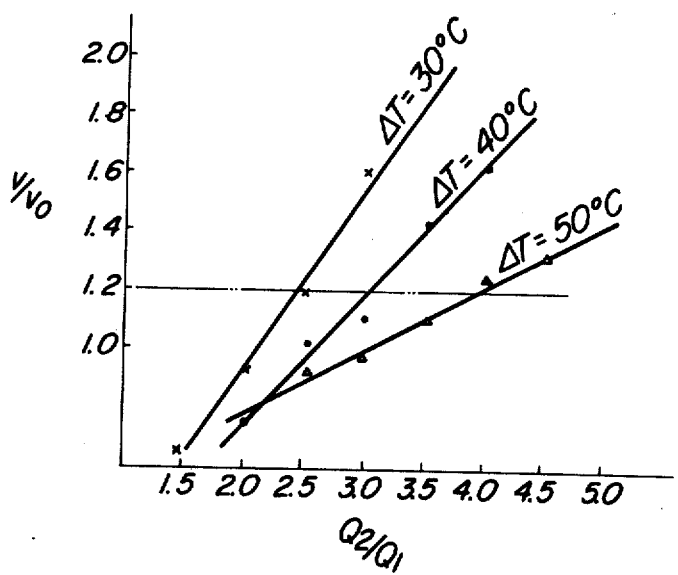
FIG. 5 is a characteristic chart showing influences of temperature differences between water in the pool and the air curtain.

Usually, temperature of the pool water is higher than that of the atmosphere therearound. Shown in FIG. 5 are relations between said air quantity ratio and ratio of flow velocity of the air curtain to elevating velocity of the contaminated gas by using the temperature difference as a parameter, in order to show influence of this temperature difference. In FIG. 5, "V" means flow velocity of air curtain,
"$V_o$" means elevating velocity of contaminated vapor,
"$\Delta T$" means temperature difference between pool water and air curtain,
"$Q_2$" means sucked air quantity and
"$Q_1$" means blown-out air quantity.

The flow velocity of the air curtain should be greater than evaporating velocity of water from the fuel pool water level, while according to the figure, when the ratio ($V/V_o$) is for example 1.2, the ratio $Q_2/Q_1$, i.e. ratio of sucked air quantity ($Q_2$) of the pull duct to blown-out air quantity ($Q_1$) of the push duct is about 2.5 in case that $\Delta T$ is 30° c, and about 3.0 in case that $\Delta T$ is 40° C. And further the ratio is attainable to about 4.0 in case that $\Delta T$ is 50° C. This owes to the fact that when said temperature difference is increased, evaporation from the water level of the fuel pool becomes more active and the vapor is apt to pass through the air curtain, so that sucked air quantity should be increased more than an increase of blown-out air quantity.

As mentioned above, in order to shield from radioactive vapor evaporated from the fuel pool by means of an air curtain, it is suitable to maintain $\Delta T$ lower than 30° C for retaining the sucked and blown-out air quantities as little as possible. Namely, since the temperature of the pool water is usually about 50° C, the temperature of air contained in the air curtain is suitably 20° C even in winter.

What is claimed is:

1. In a push-pull type shielding method of a gas flow, a gas shielding method for a fuel exchange pool which is characterized in that ratio of sucked air quantity into a pull duct to blown-out air quantity from a push duct above the fuel pool is maintained in the range of 2.0 – 4.0.

2. In a push-pull type shielding method of a gas flow, a gas shielding method for a fuel exchange pool which is characterized in that ratio of sucked air quantity into a pull duct to blown-out air quantity from a push duct above the fuel pool is maintained in the range of 2.0 – 4.0, and a temperature difference between water in the fuel pool and the shielding air is retained less than 30° C.

3. A gas shielding apparatus for a fuel exchange pool comprising a shielding cover mounted on the fuel pool for partially shielding radioactive vapor generated from the pool and having a port through which a fuel exchange is made, push and pull ducts which are mounted on the cover and on both sides of the port opposed to each other so as to form an air curtain therebetween, means for blowing out and sucking the air through said push and pull ducts, respectively, for generating the air curtain, means for maintaining a ratio of the sucked air quantity into the pull duct to the blown-out quantity from the push duct on a range of 2.0 to 4.0.

4. A gas shielding apparatus for a fuel exchange pool according to claim 3 further comprising suction ducts communicated with a space under said cover for sucking out said radioactive vapor from the space.

5. A gas shielding apparatus for a fuel exchange pool according to claim 3, further comprising temperature controlling means for controlling the temperature of the air forming the air curtain so as to be retained lower than the temperature of the fluid in the fuel pool in a range of 30° C.

6. A push-pull shielding method of a gas flow for a fuel exchange pool, which includes maintaining the ratio of sucked air quantity into a pull duct to blown-out air quantity from a push duct above the fuel exchange pool in the range of 2.0 to 4.0, and retaining the temperature of the air forming an air curtain lower than the temperature of fluid in the fuel exchange pool in the range of 30° C.

* * * * *